(12) United States Patent
Hoshino

(10) Patent No.: US 8,065,626 B2
(45) Date of Patent: Nov. 22, 2011

(54) INPUT/OUTPUT DEVICE, INPUT/OUTPUT METHOD AND PROGRAM THEREFOR

(75) Inventor: Masaru Hoshino, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 11/654,980

(22) Filed: Jan. 17, 2007

(65) Prior Publication Data

US 2007/0192721 A1 Aug. 16, 2007

(30) Foreign Application Priority Data

Jan. 17, 2006 (JP) .................................. 2006-009197
Oct. 18, 2006 (JP) .................................. 2006-284045

(51) Int. Cl.
*G06F 3/048* (2006.01)
(52) U.S. Cl. ......................... 715/786; 715/784; 715/787
(58) Field of Classification Search .................. 715/769, 715/784, 786, 787
See application file for complete search history.

(56) References Cited

U.S. PATENT DOCUMENTS

| | | | |
|---|---|---|---|
| 6,259,432 B1 | 7/2001 | Yamada et al. | |
| 6,384,845 B1 | 5/2002 | Takaike | |
| 6,922,816 B1 | 7/2005 | Amin et al. | |
| 2002/0109728 A1* | 8/2002 | Tiongson et al. ............. | 345/786 |
| 2002/0118168 A1 | 8/2002 | Hinckley et al. | |

FOREIGN PATENT DOCUMENTS

| | | |
|---|---|---|
| GB | 2 307 383 A | 5/1997 |
| JP | 9-198224 | 7/1997 |
| JP | 2000010706 A | 1/2000 |
| JP | 2000187547 A | 7/2000 |
| JP | 2000-353040 | 12/2000 |
| JP | 2001-42991 | 2/2001 |
| JP | 2003-177852 | 6/2003 |

OTHER PUBLICATIONS

European Search Report dated Sep. 29, 2008.

* cited by examiner

*Primary Examiner* — Steven Sax
*Assistant Examiner* — Andrey Belousov
(74) *Attorney, Agent, or Firm* — Nutter McClennen & Fish LLP; John J. Penny, Jr.; Christina M. Sperry

(57) ABSTRACT

A dragged portion is moved by easily operating a mouse. An input/output device using a graphical user interface, includes: a display section that displays a dragged portion and a movement region in which the dragged portion is moved on a display screen; a dragged portion movement section that selects the dragged portion by an input device and operates the input device so that the position of the dragged portion moves in the movement region on the display screen dependent on the mount of operation of the input device; and a region movement section that selects a portion other than the dragged portion in the movement region on the display screen by the input device and operates the input device, so that the position of the dragged portion in the movement region on the display screen dependent on the amount of operation of the input device. The ratio between the amount of movement of the dragged portion on the display screen and the amount of operation of the input device when the dragged portion is selected is different from the ratio between the amount of movement of the dragged portion on the display screen and the amount of operation of the input device when a portion other than the dragged portion in the movement region is selected.

10 Claims, 8 Drawing Sheets

INPUT/OUTPUT DEVICE, INPUT/OUTPUT METHOD AND PROGRAM THEREFOR

CROSS REFERENCE TO RELATED APPLICATION

The present application claims priority from Japanese Patent Applications No. 2006-009197 filed on Jan. 17, 2006 and No. 2006-284045 filed on Oct. 18, 2006, the contents of which are incorporated herein by reference.

BACKGROUND

1. Field of the Invention

The present invention relates to an input/output device, an input/output method and a computer readable medium storing thereon a program therefor. Particularly, the present invention relates to an input/output device using a graphical user interface, an input/output method and a computer readable medium storing thereon a program therefor.

2. Related Art

A device that displays a slider bar or a slider on a display screen and inputs values from a slide position on the slider bar has been known as for example, in Japanese Patent Application Publication No. 9-198224. In such device, a pointer on the display screen is moved to the slider position by actually moving such as a mouse, and the slider on the display screen is moved on the slider bar and displayed by dragging and dropping the slider by the mouse on the display screen. Thus, a graphic user interface that inputs values to the device by operating the mouse is provided to a user.

However, when the slider is moved from a value designated by the slider to a value to be newly designated by the slider by operating the mouse, the device has some problems as follows. For example, in the case that a value to be newly designated is not a correct value and the slider will be moved near that value, it is difficult to slightly move the slider on the display screen in order to change a little bit the value when the amount of movement of the slider on the display screen is larger than the amount of actual movement of the mouse. Meanwhile, when the amount of movement of the slider on the display screen is smaller than the amount of actual movement of the mouse, it take a lot of trouble because the mouse should be widely moved to move widely the slider on the display screen in order to substantially change the value.

SUMMARY

To solve the above-described problem, a first aspect of the present invention provides an input/output device using a graphical user interface. The input/output device includes: a display section that displays a dragged portion and a movement region in which the dragged portion is moved; a dragged portion movement section that moves a position of the dragged portion in the movement region on the display screen dependent on the amount of operation of an input device by selecting the dragged portion on the display screen by the input device and operating the input device; and a region movement section that moves the position of a dragged portion in the movement region on the display screen dependent on the amount of operation of the input device by selecting a portion other than the dragged portion in the movement region by the input device on the display screen and operating the input device. The ratio between the amount of movement of the dragged portion on the display screen and the amount of operation of the input device when the dragged portion is selected is different from the ratio between the amount of movement of the dragged portion on the display screen and the amount of operation of the input device when the portion other than the dragged portion in the movement region is selected. Thereby the ratio between the amount of movement of the dragged portion and the amount of movement of the input device is different dependent on which portion is dragged. Therefore, a dragged portion can be changed between a desired situation that the dragged portion is quickly and widely moved on the display screen and another desired situation that the dragged portion is precisely moved a little bit, so that the dragged portion on the display screen can be rapidly and surely moved.

The ratio between the amount of movement of the dragged portion on the display screen and the amount of operation of the input device may be different between the case that the end of the movement region is selected and the case that the center of the movement region is selected. Thereby a user who attempts to move the dragged portion can appropriately select a portion to be dragged dependent on the amount of movement the dragged portion and also can appropriately select a portion to be dragged in operating a mouse to drag the portion other than the dragged portion in the movement region. Thus, the dragged portion can be moved to a desired portion by more easily operating the input device.

The display section may display a pointer that visually displays the ratio on the display screen. Thereby a user who attempts to move the dragged portion can recognize at a glance the amount of movement of the input device. Thus, the dragged portion can be moved to a desired portion by more easily operating the input device.

The input/output device may further include a numerical value acquiring section that acquires a numerical value based on the position of the dragged portion in the movement region. Thereby requiring to input a numerical value as an input parameter, the user can change the numerical value by more easily operating the input device.

To solve the above-described problem, a second aspect of the present invention provides an input/output method using a graphical user interface. The input/output method includes the steps of: displaying a dragged portion and a movement region in which the dragged portion is moved; moving a position of the dragged portion in the movement region on the display screen dependent on the amount of operation of an input device by selecting the dragged portion on the display screen by the input device and operating the input device; and moving the position of a dragged portion in the movement region on the display screen dependent on the amount of operation of the input device by selecting a portion other than the dragged portion in the movement region by the input device on the display screen and operating the input device. The ratio between the amount of movement of the dragged portion on the display screen and the amount of operation of the input device when the dragged portion is selected is different from the ratio between the amount of movement of the dragged portion on the display screen and the amount of operation of the input device when the portion other than the dragged portion in the movement region is selected. Thereby an effect the same as that of the first aspect can be achieved.

To solve the above-described problem, a third aspect of the present invention provides a computer readable medium storing thereon a program for an input/output device using a graphical user interface. The program causes the input/output device to perform the steps of: displaying a dragged portion and a movement region in which the dragged portion is moved; moving a position of the dragged portion in the movement region on the display screen dependent on the amount of operation of an input device by selecting the dragged portion on the display screen by the input device and operating the input device; and moving the position of a dragged portion in the movement region on the display screen dependent on the amount of operation of the input device by selecting a portion other than the dragged portion in the movement region by the input device on the display screen and operating the input device. The ratio between the amount of movement of the dragged portion on the display screen and the amount of operation of the input device when the dragged portion is selected is different from the ratio between the amount of movement of the dragged portion on the display screen and the amount of operation of the input device when the portion other than the dragged portion in the movement region is selected. Thereby an effect the same as that of the first aspect can be achieved.

Here, all necessary features of the present invention are not listed in the summary of the invention. The sub-combinations of the features may become the invention.

DESCRIPTION OF EXEMPLARY EMBODIMENTS

Hereinafter, the present invention will now be described through referred embodiments. The embodiments do not limit the invention according to claims and all combinations of the features described in the embodiments are not necessarily essential to means for solving the problems of the invention.

Figure 1:
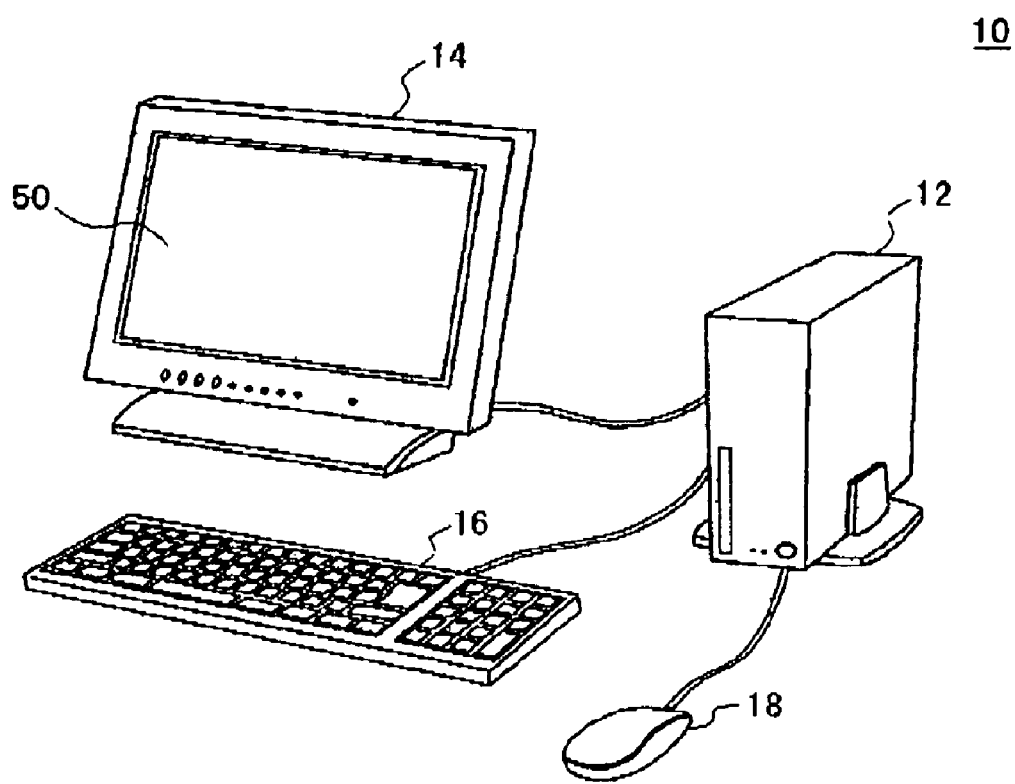
FIG. 1 shows an example of input/output device 10.

FIG. 1 shows an example of input/output device 10 according to an embodiment of the present invention. The input/output device 10 includes a main body 12 that performs a program for controlling the input/output device 10, a display 14 having a display screen 50 displays to a user based on an output from the main body 12, and a keyboard 16 and a mouse 18 each of which is an example of input device to input from the user to the main body 12. The input/output device shown in FIG. 1 accepts the input of numerical values through a graphic user interface by means of an application for an image processing as described in detail below.

Figure 2:
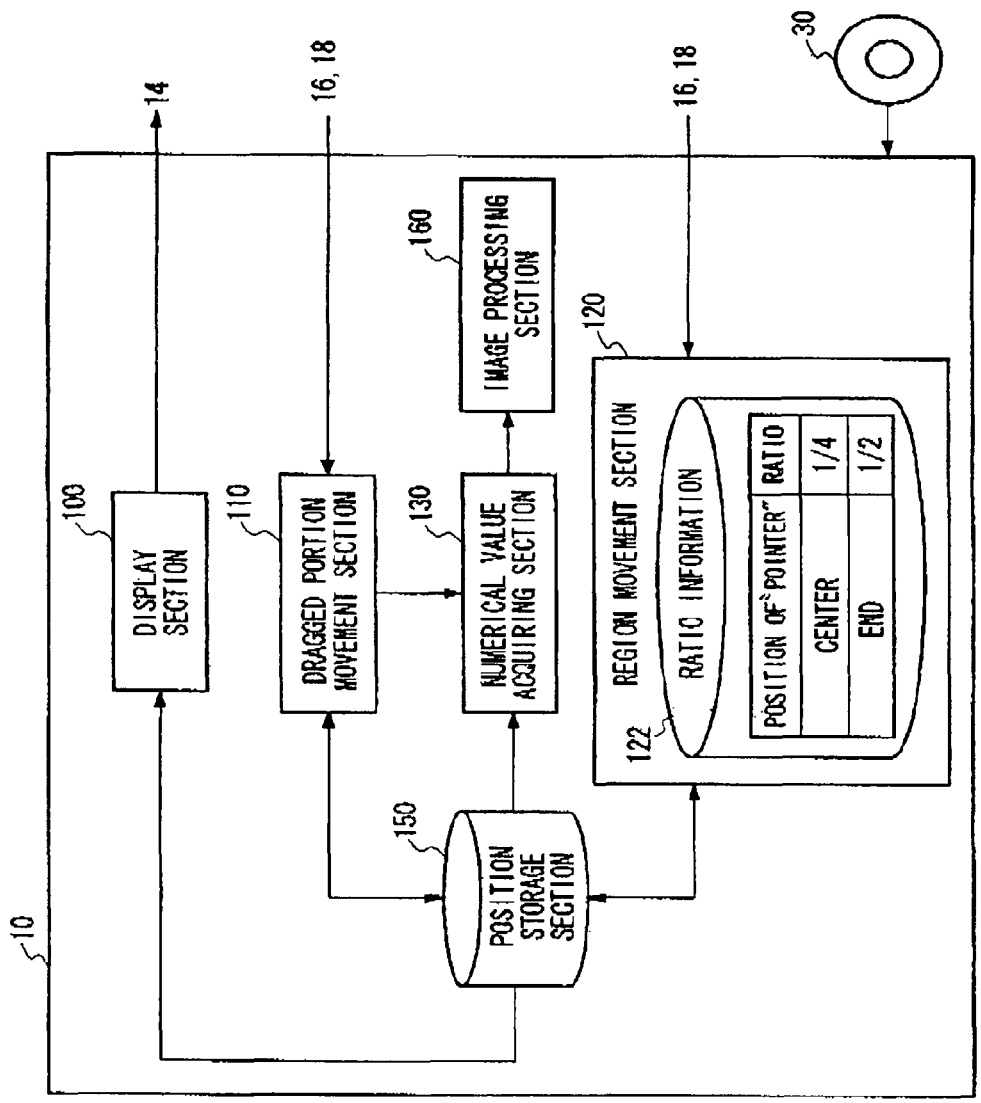
FIG. 2 is au example of block diagram showing a main body 12.
Figure 3:
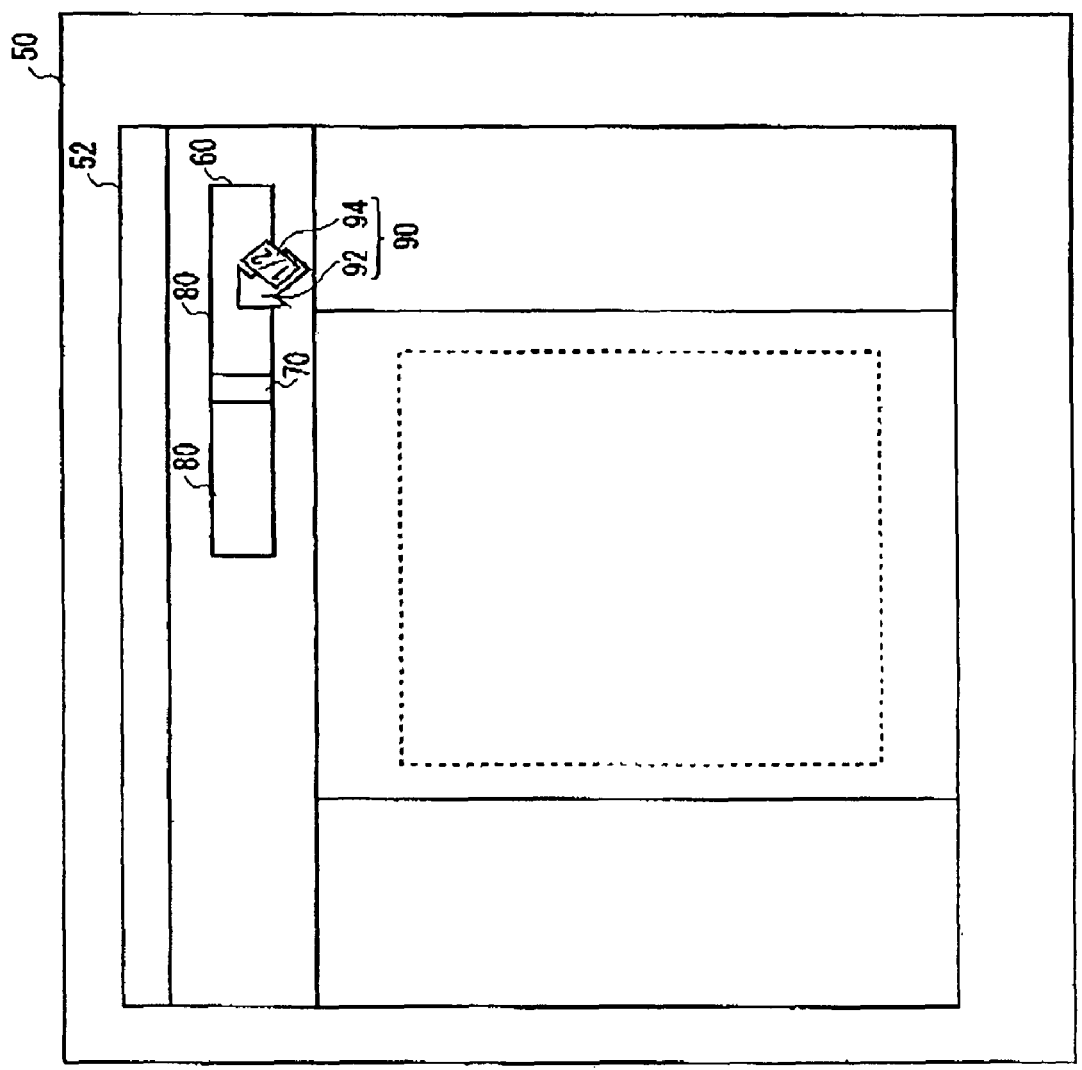
FIG. 3 is a schematic diagram showing an example of display on a display screen 50.

FIG. 2 is an example of block diagram showing the main body 12 of the input/output device 10. FIG. 3 is a schematic diagram showing an example of a display screen 50 displayed by the display section 100 of the main body 12. As shown in FIG. 2, the main body 12 includes the display section 100, an dragged portion movement section 110, a region movement section 120, a numerical value acquiring section 130, a position storage section 150 and an image processing section 160. Here, the image processing section 160 is an application for performing an image processing, but the image processing section 160 is not limited to that. The image processing section 160 performs an image processing based on the input of a numerical value such as the magnification of an image.

The display section 100 displays a window 52 that receives a processing from a user using a graphical user interface. Additionally, the display section 100 displays an dragged portion 70 as an interface for accepting the input of the numerical value from the user and a movement region 60 in which the dragged portion 70 is moved. Further, the display section 100 displays a pointer 90 that indicates the position on the display screen 50 designated by the user by means of the mouse 18. In this case, the display section 100 displays the positions of the window 52, the movement region 50, the dragged portion 70 and the pointer 90 with reference to the position storage section 150 described later.

The position storage section 150 stores the position of the movement region 60 in the window 52, the position of the dragged portion 70 in the movement region 60 and the position of the pointer 90 in the display screen 50. Additionally, the position storage section 150 previously stores a ratio between the amount of movement of the pointer 90 in the display screen 50 and the amount of operation of the mouse 18. For example, the amount of operation of the mouse 18 may be the amount of movement of the mouse 18 on a desk. Additionally, if the mouse 18 has a tilt wheel, the amount of rotating the tilt wheel is included in the amount of operation of the mouse 18.

The dragged portion movement section 110 acquires mouse information including information indicating a movement direction and the amount of movement of the mouse 18 on a desk and information indicating operation of a right button, a left button and a tilt wheel included in the mouse 18. The dragged portion movement section 110 calculates a new position of the pointer 90 on the display screen based on the above-described information, the position of the pointer 90 and the position of the dragged portion 70 stored in the position storage section 150 and the ratio between the amount of movement of the pointer 90 on the display screen 50 and the amount of movement of the mouse 18 on the desk. The dragged portion movement section 110 stores the calculated new position of the pointer 90 in the position storage section 150.

Additionally, the dragged portion movement section 110 determines whether the dragged portion 70 is dragged by the mouse 18 on the display screen 50. For example, the dragged portion movement section 110 determines that the dragged portion 70 is dragged by the mouse 18 on the display screen 50 as long as the right button of the mouse 18 is pushed when the pointer 90 is placed on the dragged portion 70. Here, to drag the dragged portion 70 on the display screen 50 means that the dragged portion 70 is selected by the mouse 18 on the display screen 50, for example. Then, while the dragged portion 70 is dragged, the dragged portion movement section 110 calculates a new position of the dragged portion 70 as well as the position of the pointer 90 was calculated, and stores the same in the position storage section 150. In this case, the ratio between the amount of movement of the dragged portion 70 on the display screen 50 and the amount of movement of the mouse 18 in dragging the dragged portion 70 may be the ratio between the amount of movement of the pointer 90 on the display screen 50 and the amount of movement of the mouse 18 on the desk.

The region movement section 120 acquires information indicating the position of the pointer 90, the position of the movement region 60, the position of the dragged portion 70 and an operation of the button of the mouse 18. Additionally, the region movement section 120 determines whether a non-dragged portion 80 other than the dragged portion 70 in the movement region 60 on the display screen 50 based on those information. In this case, the region movement section 120 determines that the non-dragged portion 80 is dragged as long as the right button of the mouse 18 is pushed. Further, when the non-dragged portion 80 is dragged, the region movement section 120 calculates a new position of the dragged portion 70 based on the position of the dragged portion 70 stored in the position storage section 150, the position at which the non-dragged portion is dragged the ratio between the amount of movement of the dragged portion 70 on the display screen 50 and the amount of movement of the mouse 18, and the movement direction and the amount of movement of the mouse 18. The region movement section 120 stores the calculated new position of the dragged portion 70 and the ratio described later in the position storage section 150.

Additionally, the region movement section 120 stores the ratio between the ratio of the dragged portion and the ratio of the non-dragged portion as ratio information 122 in association with the position of the dragged portion 70 in the movement direction in the movement region 60. Here, the ratio between the amount of movement of the dragged portion 70 on the display screen 50 and the amount of movement of the mouse 18 in dragging the non-dragged portion 80 (hereinafter referred to as a non-dragged portion ratio) is different from the ratio between the amount of movement of the dragged portion 70 on the display screen 50 and the amount of movement of the mouse 18 in dragging the dragged portion 70 (hereinafter referred to as an dragged portion ratio) Thereby the ratio between the amount of movement of the dragged portion 70 on the display screen 50 and the amount of movement of the mouse 18 is different dependent on which portion is dragged. Therefore, any dragged portion can be changed between a desired situation that the dragged portion 70 is quickly and widely moved on the display screen 50 and another desired situation that the dragged portion 70 is precisely moved a little bit, so that the dragged portion 70 on the display screen 50 can be rapidly and surely moved.

Here, it is preferred that the non-dragged portion ratio is different between when the end of the movement region 60 is dragged and when the center of the movement region 60 is dragged. Thereby a user who attempts to move the dragged portion can appropriately select a portion to be dragged dependent on the amount of movement of the dragged portion and also can appropriately select a portion to be dragged in operating a mouse to drag the portion other than the dragged portion in the movement region. Thus, the dragged portion can be moved to a desired portion by more easily operating the input device. Here, region movement section 120 causes the position storage section 150 to store the ratio between the dragged portion ratio and the non-dragged portion ratio at a position at which the non-dragged portion 80 is dragged.

As shown in FIG. 3, when the pointer 90 is displayed on the movement region 60, the display section 100 may display the pointer 90 an arrow section 92 that indicates a position designated by the user on the display screen 50 and a ratio section 94 that visually indicates the ratio stored in ratio information 122 at the position at which the non-dragged portion 80 is dragged. The display section 100 displays the pointer 90 including the ratio section 94 based on the ratio stored in the position storage section 150 when the non-dragged portion 80 is dragged, for example. Thereby the user who attempts to move the dragged portion 70 can recognize the amount for which the mouse 18 should be moved at a glance and move the dragged portion 70 to a desired position by more easily operating the mouse 18.

When the display section 100 displays the pointer 90 on the movement region 60, the movement region 60 may be highlighted. For example, when the display section 100 displays the pointer 90 on the movement region 60, the color or pattern of the movement region 60 may be changed. Alternatively or additionally, when the display section 100 displays the pointer 90 on the movement region 60, the size of the movement region 60 may be increased. Thereby the user can recognize at a glance that the pointer 90 is placed in the movement region 60.

The numerical value acquiring section 130 stores read information on which the numerical value is stored in association with the position of the dragged portion 70. The numerical value acquiring section 130 refers the position of the dragged portion 70 stored in the position storage section 150 and inputs the referred position of the dragged portion 70 and the read information to acquire the numerical value. The numerical value acquiring section 130 provides the acquired numerical value to the image processing section 160. Thereby inputting the numerical value as an input parameter to the image processing section 160, the user can change the numerical value by more easily operating the mouse 18. The numerical value acquiring section 130 may provide the acquired numerical value to the outside of the input/output device 10.

A storage medium 30 stores a program that causes the display section 100, the dragged portion movement section 110, the region movement section 120 and the numerical value acquiring section 130 to operate. The program stored in the storage medium 30 may be installed in the main body 12 to cause the display section 100 and so forth to operate. In addition, the main body 12 may acquire such program through a communication line.

Figure 4:
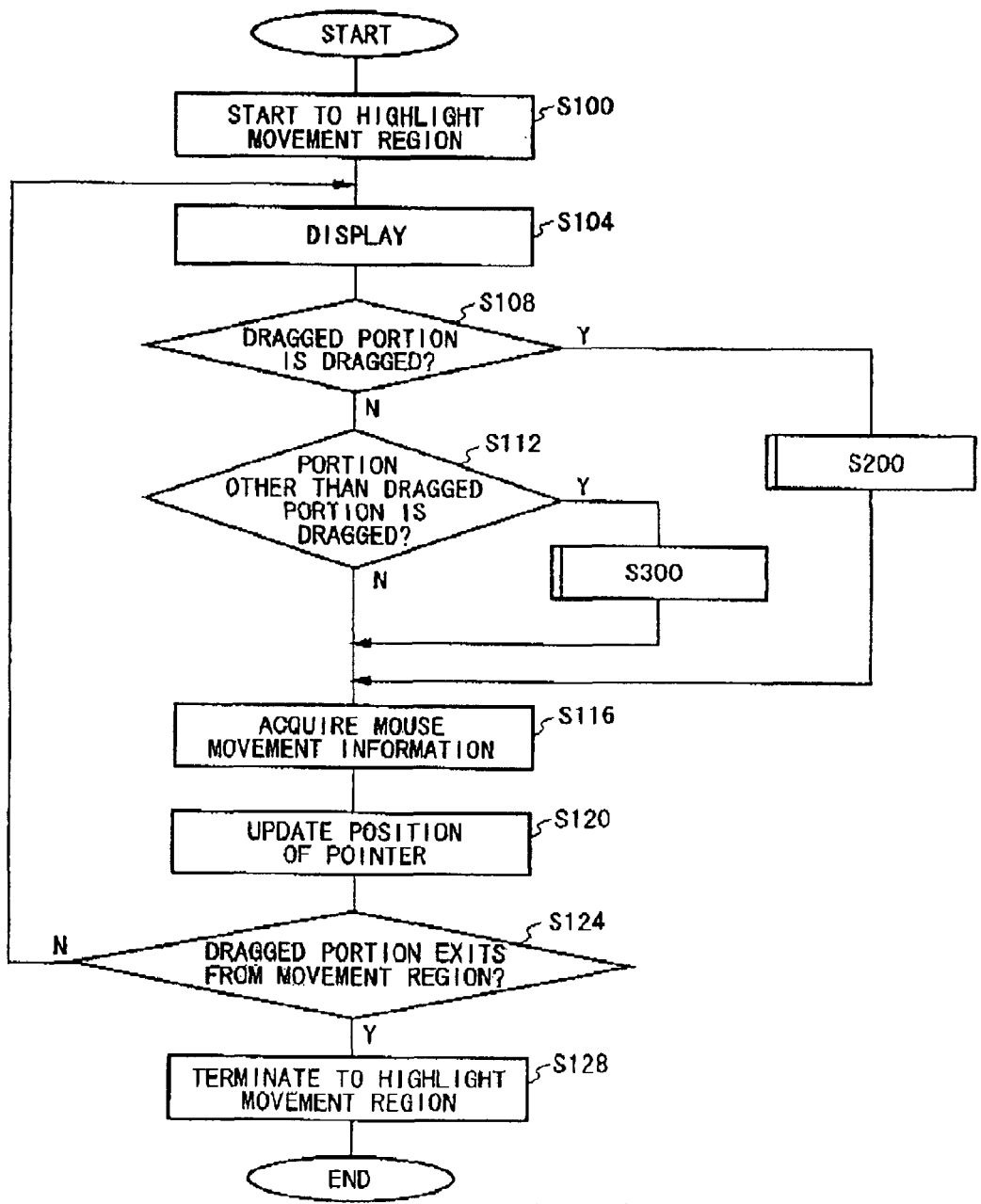
FIG. 4 is a flowchart of an example of operation of the input/output device 10.
Figure 7A:
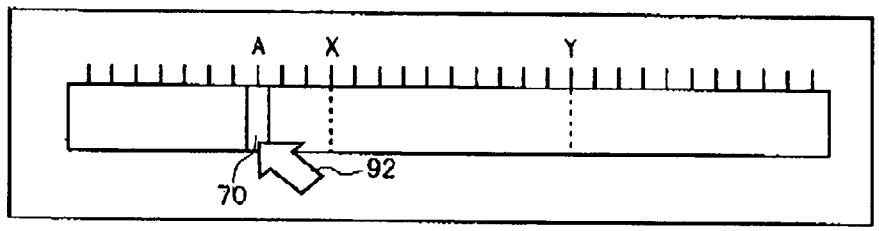
FIG. 7 is a schematic diagram showing an example of movement region 60 and dragged portion 70.
Figure 7B:
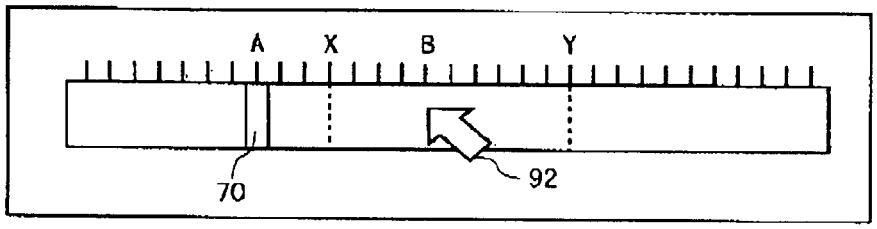
Figure 7C:
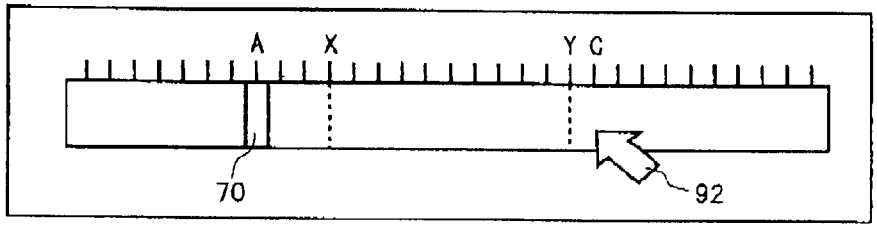

FIG. 4 is a flowchart of an example of operation of the input/output device 10. Each of FIG. 7A-7C is a schematic diagram showing an example of movement region 60 and displayed dragged portions 70. Each of FIG. 8A-8E is a schematic diagram showing an example of movement region 60 and displayed dragged portions 70. The flowchart starts who the pointer 90 enters the movement region 60. That is, the flowchart starts when the dragged portion movement section 110 determines that the pointer 90 enters the movement region 60 based on the position of the movement region 60 stored in the position storage section 150 and the calculated new position of the pointer 90. Firstly, the pointer 90 enters a position shown in FIG. 7A. Dashed lines at X and Y in FIG. 7A-7C indicate lines which divide the movement region 60 by the position of the dragged portion in a direction to which the dragged portion moves. Then, the dragged portion movement section 110 stores 1/4 in association with a region being the left side of X, 1/2 in association with a region between X and Y, and 1/4 in association with a region being the right side of Y as ratio information 122.

When the pointer 90 enters the movement region 60, the display section 100 starts to highlight the movement region 60 (S100). For example, the movement region 60 and the dragged portion 70 may be enlarged and displayed, or the color of the movement region 60 and the dragged portion 70 may be deepen. Thereby the user can recognize at a glance that the pointer 90 is placed in the movement region 60. Here, all of the movement regions 60 shown in FIG. 7 and FIG. 8 are highlighted. Next, the display section 100 refers the position of the dragged portion 70 stored in the position storage section 150 and the position of the pointer 90 and displays the same in the movement region 60 as shown in FIG. 7A (S104).

The dragged portion movement section 110 determines whether the dragged portion 50 is dragged on the display screen 50 based on information indicating the position of the dragged portion 70 and the operation of the button of the mouse 18 (S108). In this case, when it is detected that the right button of the mouse 18 is pushed as long as the pointer 90 is placed on the dragged portion 70, the dragged portion movement section 110 determines that the dragged portion 70 is dragged.

In the step S108, when the dragged portion 70 is dragged on the display screen 50 (S108: YES), the dragged portion movement section 110 performs step S200 for processing the movement of the dragged portion 70 when the dragged portion 70 is dragged. The step S200 will be described later with reference to FIG. 5.

Meanwhile, in the step S108, when the dragged portion 70 is not dragged on the display screen 50 (S108: No), the dragged portion movement section 110 determines whether the non-dragged portion 80 is dragged on the display screen 50 based on information indicating the referred position of the pointer 90, the position of the movement region 60, the position of the dragged portion 70 and the operation of the button of the mouse 18 (S112).

When the non-dragged portion 80 is dragged on the display screen 50 in the step S112 (S112: Yes), the region movement section 120 performs step S300 for processing the movement of the dragged portion 70 when the non-dragged portion 80 is dragged. The step S300 will be described later with reference to FIG. 6. Here, in this case (S112: Yes), the position storage section 150 acquires the ratio between the non-dragged portion ratio and the dragged portion ratio at the position of the pointer 90 from the region movement section 120 and stores therein the same.

Meanwhile, when the non-dragged portion 80 is not dragged on the display screen 50 in the step S112 (S112: No), the dragged portion movement section 110 acquires the mouse information and calculates the above-described position to which the pointer 90 moves (S116). The position storage section 150 updates the stored position of the pointer 90 based on a new position of the pointer 90 acquired from the dragged portion movement section 110 (S120).

The dragged portion movement section 110 determines whether the pointer 90 exits from the movement region 60 based on the new position of the pointer 90 calculated in the step S120 and the position of the movement region 60 (S124). When the pointer 90 exits from the movement region 60 (S124: Yes), the display section 100 terminates to highlight the movement region 60 (S128). Then, the flowchart is ended.

Meanwhile, the pointer 90 does not exit from the movement region 60 in the step the 124 (S124: No), the dragged portion movement section 110 returns to the step S104 and repeats the above-described steps. For example, in the second time of the step S104, the display section 100 displays the pointer 90 at a position B on the movement region 60 with reference to the position of the pointer 90 updated by the position storage section 150 in the step 120 as shown in FIG. 7B (S104). Additionally, in three time of the step S104, the pointer 90 is displayed at a position C on the movement region 60 as shown in FIG. 7C as shown in FIG. 7C (S104).

Figure 5:
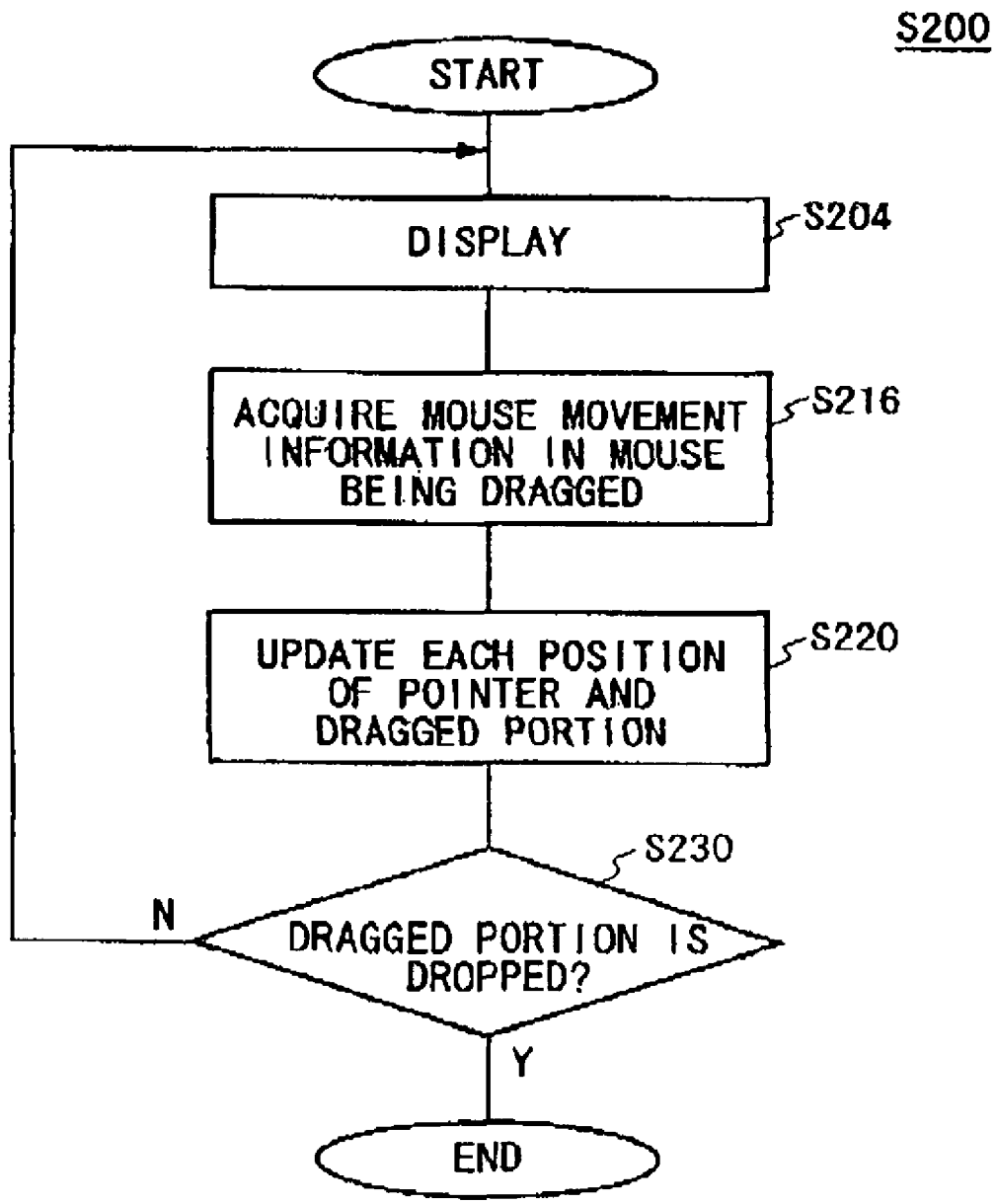
FIG. 5 is a flowchart of an example of operation of the input/output device 10.

FIG. 5 is a flowchart of an example of operation of the input/output device 10 in the step 200. FIG. 8 is a schematic diagram showing an example of movement region 60 and dragged portion 70 which is displayed. The flowchart starts when the dragged portion 70 is dragged on the display screen 50 in the step S108 shown in FIG. 4. At the time at which the flowchart is started, the display section 100 displays the dragged portion 70 and the pointer 90 at the position shown in FIG. 7A. The dashed lines indicated at the positions X and Y in FIG. 8A-8E are the same as those of FIG. 7A-7C.

The display section 100 refers the position of the dragged portion 70 and the position of the pointer 90 stored in the position storage section 150 and displays the same in the movement region 60 (S204). For example, when the step 204 is performed subsequent to the step S108, the display section 100 displays the dragged portion 70 and the pointer 90 at the positions shown in FIG. 7A. Here, the display section 100 displays that the dragged portion 70 is moved. For example, the display section 100 changes the color or the size of the dragged portion 70 and displays the same.

The dragged portion movement section 110 acquires mouse information in dragging the dragged portion 70 (S216). The dragged portion movement section 110 inputs the referred position of the pointer 90, the ratio between the amount of movement of the pointer 90 on the display screen 50 and the referred amount of movement of mouse 10 on the desk, and the movement direction and the amount of movement of the mouse 18 acquired in the step S216 to calculate a new position of the pointer 90. The dragged portion movement section 110 provides the calculated new position of the pointer 90 to the position storage section 150. The position storage section 150 updates the stored position of the pointer 90 and the stored position of the dragged portion 70 based on the new position of the pointer 90 acquired from the dragged portion movement section 110 (S220).

The dragged portion movement section 110 determines whether the dragged portion 70 is dropped on the display screen 50 based on information indicating the operation of the bottom of the mouse 18 (S230). When the dragged portion 70 is dropped in the step S230 (S230: Yes), the display section 100 stops displaying that the dragged portion 70 is moved shown in the S204. Then, the flowchart is terminated, and next, step S116 in the flowchart shown in FIG. 4 is performed.

Figure 8A:
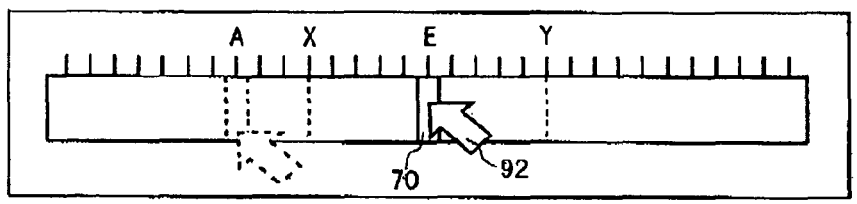
FIG. 8 is a schematic diagram showing an example of movement region 60 and dragged portion 70.

Meanwhile, the dragged portion 70 is dragged in the step S230 (S230: No), return to the step S204 and repeat the above-described steps. For example, in the second time of the step S204, the display section 100 refers the position of the pointer 90 updated by the position storage section 150 in the step S220 and the position of the dragged portion 70 and displays the pointer 90 and the dragged portion 70 at a position E in the movement region 60 as shown in FIG. 8A (S204). Here, the pointer 90 and the dragged portion 70 indicated by the dashed lines at a position A in FIG. 8A indicate the pointer 90 and the dragged portion 70 before being moved. The pointer 90 and the dragged portion 70 indicated by the solid lines indicate the pointer 90 and the dragged portion 70 after being moved.

As described above, when the dragged portion 70 is dragged and the mouse 18 is moved on the display screen 50, the dragged portion movement section 110 moves the dragged portion 70 at a predetermined ratio to the amount of movement of the mouse 18 and displays the same.

Figure 6:
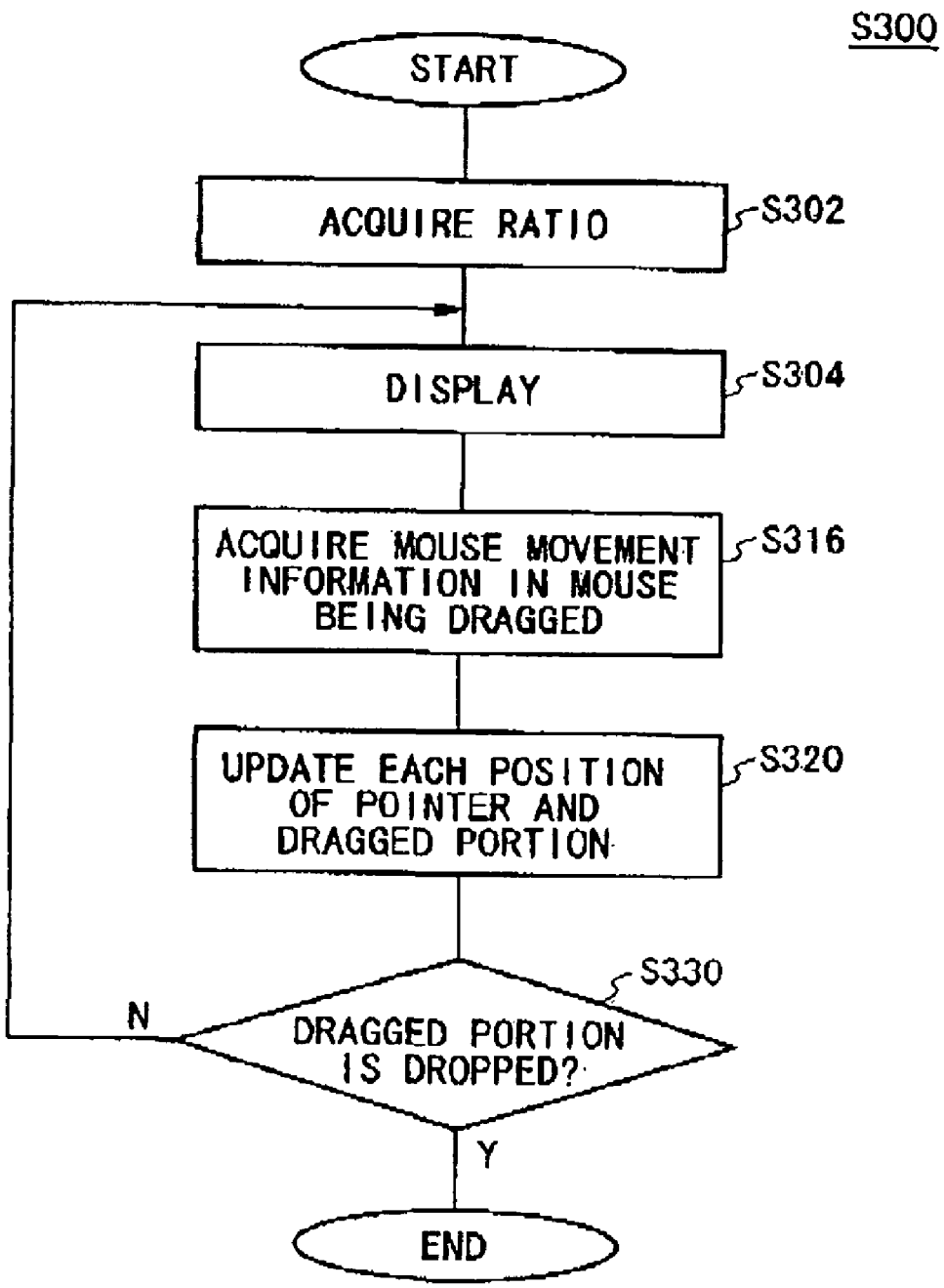
FIG. 6 is a flowchart of an example of operation of the input/output device 10.

FIG. 6 is a flowchart of an example of operation of the input/output device 10 in step 300. The flowchart starts when the non-dragged portion 80 is dragged on the display screen 50 in the step S112 in the flowchart shown in FIG. 4. At the time at which the flowchart is started, the display section 100 displays the dragged portion 70 and the pointer 90 at the position shown in FIG. 7B. The position storage section 150 stores the ratio between the non-dragged portion ratio and the dragged portion ratio provided in the step S112. That is, the position storage section 150 stores therein the ratio between the non-dragged portion ratio and the dragged portion ratio at the position at which the mouse starts to drag the non-dragged portion 80.

The region movement section 120 acquires the ratio between the dragged portion ratio and the non-dragged portion ratio at the position at which the mouse stars to drag the non-dragged portion 80, which is stored in the position storage section 150 (S302).

The display section 100 refers the position of the dragged portion 70 stored in the position storage section 150 and the position of the pointer 90 and displays the same on the movement region 60 (S304). For example, in the case that the step S304 is performed subsequent to the step S108, the display section 100 displays the dragged portion 70 and the pointer 90 at the position shown in FIG. 7B. Further, the display section 100 refers the ratio between the dragged portion ratio and the non-dragged portion ratio at the position at which the mouse starts to drag the non-dragged portion 80, which is stored in the position storage section 150 and displays a ratio section 94 of the pointer 90.

The region movement section 120 acquires mouse information in dragging the non-dragged portion 80 (S316). The region movement section inputs the referred position of the pointer 90, the ratio between the amount of movement of the pointer 90 on the display screen 50 and the referred amount of movement of mouse 18 on the desk, and the movement direction and the amount of movement of the mouse 18 acquired in the step S216 to calculate a new position of the pointer 90. Additionally, the region movement section 120 inputs, in addition to them, the ratio between the dragged portion ratio and the non-dragged portion ratio stored in the step S302 to calculate a new position of the dragged portion 70. The region movement section 120 provides the calculated positions of the pointer 90 and the dragged portion 70 to the position storage section 150. The position storage section 150 updates the position of the pointer 90 and the position of the dragged portion 70 which are stored therein based on the position of the pointer 90 and the position of the dragged portion 70 acquired from the dragged portion movement section 110 (S230).

The region movement section 120 determines whether the non-dragged portion 80 is dropped on the display screen 50 based on information indicating the operation of the button of the mouse 18 (S330). When the non-dragged portion 80 is dropped on the display screen 50 in the step S330 (S330: Yes), the display section 100 stops displaying that the non-dragged portion 80 is moved shown in the S304, and also stops displaying the ratio section 94. Then, the flowchart is terminated, and next, step the S116 in the flowchart shown in FIG. 4 is performed.

Meanwhile, the non-dragged portion 80 is dragged on the display screen 50 in the step S330 (S330: No), return to the step S304 and repeat the above-described steps.

For example, in the second time of the step S304, the display section 100 refers the position of the pointer 90 and the position of the dragged portion 70 updated by the position storage section 150 in the step S320 and displays the pointer 90 and the dragged portion 70 (S204).

Figure 8B:
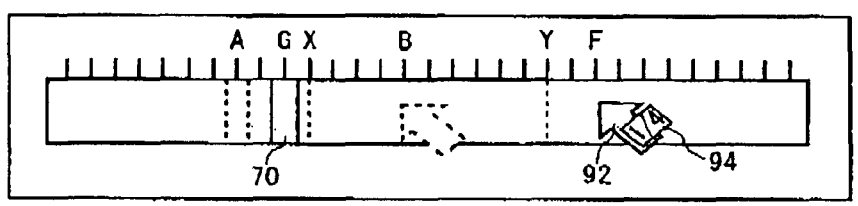

For example, FIG. 8B shows that the mouse starts to drag the non-dragged portion 80 at a position B shown in FIG. 7B and drops the same at a position F shown in FIG. 8B. The dragged portion 70 and the pointer 90 indicated by dashed lines at the position A and the position B in FIG. 8B indicate the dragged portion 70 and the pointer 90 just before the non-dragged portion 80 is dragged. The dragged portion 70 and the pointer 90 indicated by solid lines at a position G and a position F in FIG. 8B indicate the dragged portion 70 and the pointer 90 just before the non-dragged portion 80 is dropped. The numerical value 1/4 of the ratio section 94 of the pointer 90 shown at F indicates the non-dragged portion ratio at the position B where the mouse starts to drag the non-dragged portion 80. Then, the dashed lines, the solid lines and the ratio section 94 in FIG. 8C-8E are the same as those of FIG. 8B.

In an example of FIG. 8B, since the non-dragged portion ratio is 1/4, the dragged portion 70 is moved by 1/4 (2 scales) of 8 scales which is ratio of the amount of movement of the pointer 90 to the amount of movement of the mouse 18. That is, the ratio between the amount of movement of the dragged portion 70 on the display screen 50 and the amount of movement of the mouse 18 when the mouse 18 drags a portion other than the dragged portion 70 in the movement region 60 is one-quarter of the ratio between the amount of movement of the dragged portion on the display screen 50 and the amount of movement of the mouse 18 when the mouse drags the dragged portion 70. Therefore, even if the amount of movement of the pointer 90 (from B to F) shown in FIG. 8B is the same as the amount of movement of the pointer 90 (from A to G) shown in FIG. 8A when the dragged portion 70 is dragged, the amount of movement of the dragged portion 70 (from A to G) shown in FIG. 8B is one-quarter of the amount of movement of the dragged portion 70 shown in FIG. 8A.

Figure 8C:
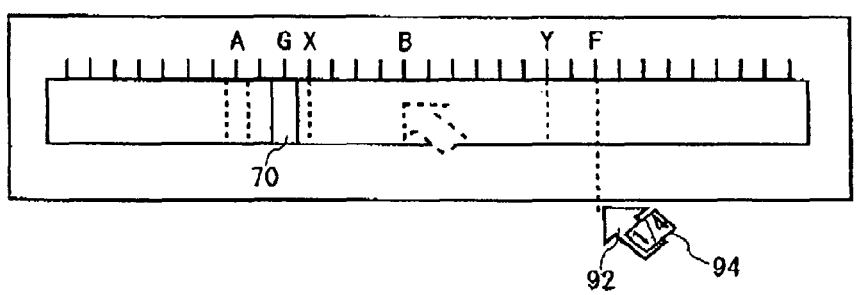

FIG. 8C shows the case that the mouse starts to drag the non-dragged portion 80 at the position B in FIG. 7B and drops the same on the outside of the movement region 60. In this case, the region movement section 120 performs the same as the case in FIG. 8B, where the position at which the non-dragged portion 80 is dropped on the movement section 60 in the direction to which the dragged portion 70 moves is the same as FIG. 8B.

Figure 8D:
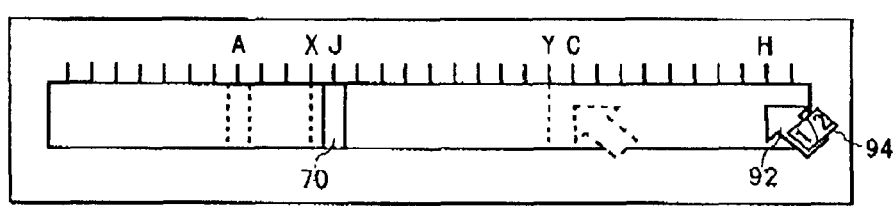
Figure 8E:
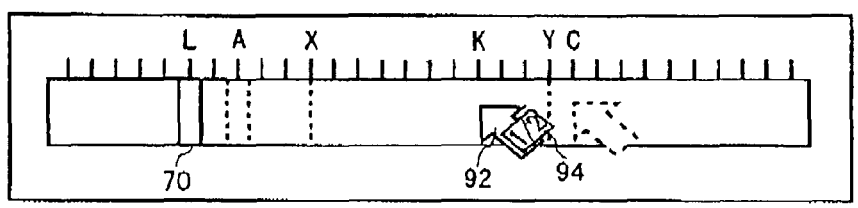

FIG. 8D shows the case that the mouse starts the non-dragged portion 80 at the position C in FIG. 7C and drops the same at a position H in FIG. 8D. As shown in FIG. 8D, the ratio of the amount of movement of the dragged portion 70 on the display screen 50 to the amount of movement of the mouse 18 is different between the case that a region C placed in the right side of Y being the end of the movement region 60 as shown in FIG. 8D is dragged and the case that the region B between X and Y being the center of the movement region. In an example of FIG. 8D, since the non-dragged portion ratio is 1/2, the dragged portion 70 is moved by 1/2 (4 scales) of 8 scales which is ratio of the amount of movement of the pointer 90 to the amount of movement of the mouse 18. Therefore, even if the amount of movement of the pointer 90 (from B to F) shown in FIG. 8B is the same as the amount of movement of the pointer 90 (from C to H) shown in FIG. 8D, the amount of movement of the dragged portion 70 (from A to J) shown in FIG. 8D is different from the amount of movement of the dragged portion 70 shown in FIG. 8B (from A to G).

FIG. 8E shows the case that the mouse starts to drag the non-dragged portion 80 at the position C in FIG. 7C and drops the same at a position K in FIG. 8E. In the case of FIG. 8D in which the pointer 90 is moves to a position H placed at the right side of the position C at which the mouse starts to drag the non-dragged portion 80, the dragged portion 70 is moved to a direction the same as the direction to which the pointer 90 moves (from A to J) as shown in FIG. 8D. In the same way, in the case of FIG. 8E in which the pointer 90 is moved to a position K placed at the left side of the position C at which the mouse starts to drag the non-dragged portion 80, the dragged portion 70 is moved to a direction the same as the direction to which the pointer 90 moves (from A to L).

As described above, when the non-dragged portion 80 is dragged and the mouse 18 is moved on the display screen 50, the region movement section 120 moves the dragged portion 70 on the display screen 50 at the above-described non-dragged portion ratio to the amount of movement of the mouse 18 and displays the same.

According to the present embodiment as described above, the ratio between the amount of movement of the dragged portion 70 on the display screen 50 and the amount of movement of the mouse 18 is different dependent on which portion id dragged. Therefore, any dragged portion can be changed between a desired situation that the dragged portion 70 is quickly and widely moved on the display screen 50 and another desired situation that the dragged portion 70 is precisely moved a little bit, so that the dragged portion 70 on the display screen 50 can be rapidly and surely moved.

Here, a condition that the dragged portion 70 is selected by the mouse 18 is not limited to the condition that the dragged portion 70 is dragged by the mouse 18. For example, the condition that the dragged portion 70 is selected by the mouse 18 may be a period for which the pointer 90 is placed on the dragged portion 70 and the right button of the mouse 18 is pushed and the pointer 90 is pushed again on the dragged portion 70 or not on the dragged portion 70.

Additionally, the input device is not limited to the mouse but may be a track pad, a track ball, a pointing stick and a pen tablet. The mouse may be a wireless mouse. Accordingly, the amount of operation of the input device is not limited to the amount of movement of the input device but may be the mount of operation inputted to the input device. For example, the amount of operation of the pointing stick may be inputted dependent on the time for which the pointing stick is tilted.

Here, the image processing section 160 has functions of editing and reproducing moving images. Examples of function of editing moving image are various filterings and a cross-fading. Inputs for setting those functions are the same as described above. Examples of function of reproducing moving image is setting of a position at which a reproduction is started, the size of reproduction and the speed of reproduction, and adjusting of balance of the volume. Inputs for those functions are the same as described above. That is, the user drags the dragged portion and the movement region thereof and moves the same using the input device in order to set parameters used for setting for a processing and operating at editing and reproducing moving images. Therefore, the parameters can be more easily changed and adjusted. For example, in order to reproduce a moving image, the user firstly drags the dragged portion and moves the same to a desired reproducing position by the minute, and then, drags and moves the movement region while the ratio section 94 indicates "1/60" or "one second", go that the user can easily adjust the reproducing position by the minute and start to reproduce the moving image at the desired reproducing position.

Still more, the input/output device 10 has an application section (not shown in Figure) that achieves at least one function of an web browser, a word processor, a spreadsheet, a commercial or research simulator or an entertainment video game. Inputs for those functions are the same as described above. That is, the user can more easily input to the application section by dragging the dragged portion and the movement region thereof and moving the same by using the input device. For example, in using a word processor, the user drags the dragged portion and moves the same while the ratio section 94 indicates "1/1" or "10p", so that pages are progressed or returned by ten pages, and drags the dragged portion and moves the same while the ratio section 94 indicates "1/10" or "1p", so that a page is progressed or returned page by page. Additionally, the user drags the dragged portion on an web browser and moves the same, so that a display screen is moved per screen, and drags the dragged portion on an web browser and moves the same while the ratio section 94 indicates "1/4" or "25%", so that a display screen is moved by 1/4 screen. Thus, the operation can be more easily performed. Here, any application which are not described above and any program other than the application program can be applicable, of course.

While the present invention have been described with the embodiment the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An input/output device using a graphical user interface, comprising:
   a display section that displays a dragged portion and a movement region in which the dragged portion is moved, said display section displaying on a display screen;
   a dragged portion movement section that moves a position of the dragged portion in the movement region on the display screen dependent on an amount of operation of an input device by selecting the dragged portion on the display screen by the input device and operating the input device in a first direction; and
   a region movement section that moves the position of the dragged portion in the movement region on the display screen dependent on the amount of operation of the input device by selecting a second portion, other than the dragged portion, in the movement region by the input device on the display screen and operating the input device in the first direction,
   wherein a ratio between the amount of movement of the dragged portion on the display screen and the amount of operation of the input device when the dragged portion is selected is different from the ratio between the amount of movement of the dragged portion on the display screen and the amount of operation of the input device when the second portion in the movement region is selected;
   wherein the ratio between the amount of movement of the dragged portion on the display screen and the amount of operation of the input device is different between the case that the end of the second portion in the movement region is selected and the case that the center of the second portion in the movement region is selected;
   wherein the display section displays a pointer with an attached numerical value displaying the ratio, and highlights the movement region when the pointer enters the movement region by enlarging the dragged portion and the movement region; and
   the dragged portion being a knob of a scroll bar and the movement region being a track of the scroll bar.

2. The input/output device as set forth in claim 1 further comprising a numerical value acquiring section that acquires a numerical value based on the position of the dragged portion in the movement region.

3. An input/output method using a graphical user interface, comprising:
   displaying, on a display screen, a dragged portion and a movement region in which the dragged portion is moved;
   moving a position of the dragged portion in the movement region on the display screen dependent on an amount of operation of an input device by selecting the dragged portion on the display screen by the input device and operating the input device in a first direction;

moving the position of a dragged portion in the movement region on the display screen dependent on the amount of operation of the input device by selecting a second portion, other than the dragged portion, in the movement region by the input device on the display screen and operating the input device in the first direction, and displaying a pointer with an attached numerical value displaying the ratio, and highlighting the movement region when the pointer enters the movement region by enlarging the dragged portion and the movement region, and wherein a ratio between the amount of movement of the dragged portion on the display screen and the amount of operation of the input device when the dragged portion is selected is different from the ratio between the amount of movement of the dragged portion on the display screen and the amount of operation of the input device when the second portion in the movement region is selected;

the dragged portion being a knob of a scroll bar and the movement region being a track of the scroll bar; and the ratio between the amount of movement of the dragged portion on the display screen and the amount of operation of the input device is different between the case that the end of the second portion in the movement region is selected and the case that the center of the second portion in the movement region is selected.

4. A non-transitory computer readable non-transitory storage medium storing thereon a program for an input/output device using a graphical user interface, the program causes the input/output device to perform the steps of:

displaying, on a display screen, a dragged portion and a movement region in which the dragged portion is moved;

moving a position of the dragged portion in the movement region on the display screen dependent on an amount of operation of an input device by selecting the dragged portion on the display screen by the input device and operating the input device in a first direction;

moving the position of a dragged portion in the movement region on the display screen dependent on the amount of operation of the input device by selecting a second portion, other than the dragged portion, in the movement region by the input device on the display screen and operating the input device in the first direction; and displaying a pointer with an attached numerical value displaying the ratio, and highlighting the movement region when the pointer enters the movement region by enlarging the dragged portion and the movement region.

wherein a ratio between the amount of movement of the dragged portion on the display screen and the amount of operation of the input device when the dragged portion is selected is different from the ratio between the amount of movement of the dragged portion on the display screen and the amount of operation of the input device when the second portion in the movement region is selected;

the dragged portion is a knob of a scroll bar and the movement region is a track of the scroll bar; and the ratio between the amount of movement of the dragged portion on the display screen and the amount of operation of the input device is different between the case that the end of the second portion in the movement region is selected and the case that the center of the second portion in the movement region is selected.

5. The input/output device as set forth in claim 1, wherein the dragged portion can only be moved in the movement region by selecting a portion of the track and operating the input device, the dragged portion and the second portion being portions of the track.

6. The input/output device as set forth in claim 1, wherein the scroll bar is a rectangular region, and the track is a linear track between two opposed sides of the rectangular region.

7. The input/output method as set forth in claim 3, wherein the dragged portion can only be moved in the movement region by selecting a portion of the track and operating the input device, the dragged portion and the second portion being portions of the track.

8. The input/output method as set forth in claim 3, wherein the scroll bar is a rectangular region, and the track is a linear track between two opposed sides of the rectangular region.

9. The computer readable medium as set forth in claim 4, wherein the dragged portion can only be moved in the movement region by selecting a portion of the track and operating the input device, the dragged portion and the second portion being portions of the track.

10. The computer readable medium as set forth in claim 4, wherein the scroll bar is a rectangular region, and the track is a linear track between two opposed sides of the rectangular region.

* * * * *